US 7,239,718 B2

(12) United States Patent
Park et al.

(10) Patent No.: US 7,239,718 B2
(45) Date of Patent: Jul. 3, 2007

(54) APPARATUS AND METHOD FOR HIGH-SPEED MARKER-FREE MOTION CAPTURE

(75) Inventors: Chang Joon Park, Taejon (KR); Ji Hyung Lee, Taejon (KR); Do-Hyung Kim, Taejon (KR); Seung Woo Nam, Taejon (KR); Seong Min Baek, Taejon (KR); In Ho Lee, Taejon (KR)

(73) Assignee: Electronics and Telecommunications Research Institute, Taejon (KR)

( * ) Notice: Subject to any disclaimer, the term of this patent is extended or adjusted under 35 U.S.C. 154(b) by 493 days.

(21) Appl. No.: 10/445,825

(22) Filed: May 28, 2003

(65) Prior Publication Data

US 2004/0119716 A1    Jun. 24, 2004

(30) Foreign Application Priority Data

Dec. 20, 2002    (KR)    ............ 10-2002-0081954

(51) Int. Cl.
*G06T 7/00* (2006.01)

(52) U.S. Cl. ........................... 382/103; 345/604

(58) Field of Classification Search ............ 345/475
See application file for complete search history.

(56) References Cited

U.S. PATENT DOCUMENTS 6,057,859 A * 5/2000 Handelman et al. ........ 345/474
6,140,997 A * 10/2000 Tanaka ...................... 345/604
6,191,798 B1 * 2/2001 Handelman et al. ........ 345/473

(Continued)

FOREIGN PATENT DOCUMENTS

JP    10-222668    8/1998

(Continued)

OTHER PUBLICATIONS

C. Wren, A. Azarbayejani, T. Darrell, A. Pentland (1996). Pfinder: real-time tracking of the human body. Automatic Face and Gesture Recognition, p. 51-56. Discussion of blob-based algorithms.*

(Continued)

*Primary Examiner*—Ulka J. Chauhan
*Assistant Examiner*—Peter-Anthony Pappas
(74) *Attorney, Agent, or Firm*—Lowe Hauptman & Berner LLP (57) ABSTRACT

A high-speed marker-free motion capture, which is capable of powerfully detecting a body's feature points corresponding to a body's end portions such as a head, hands, feet, trunk, arms and legs at a high speed in an illumination change or background or noises of cameras. The extracted feature points of the body can be directly tracked stably in a 3-dimensional space. The position errors of the feature points due to the change of the illumination conditions or a shadow can be automatically corrected and the feature points can be stably tracked with respect to overlapping and disappearance of the feature points. Further, when coordinates of the middle joints are estimated using 3-dimensional coordinates of the extracted feature points of the body, the present invention restores a human model by estimating the positions of the middle joints of the actor with high accuracy without using a motion database, thereby securing the stability and reality of the 3-dimensional motion data required in the motion capture.

7 Claims, 4 Drawing Sheets

U.S. PATENT DOCUMENTS

| | | | |
|---|---|---|---|
| 6,554,706 B2 * | 4/2003 | Kim et al. | 463/36 |
| 6,664,531 B2 * | 12/2003 | Gartner et al. | 250/208.1 |
| 6,674,877 B1 * | 1/2004 | Jojic et al. | 382/103 |
| 6,768,489 B2 * | 7/2004 | Jeong et al. | 345/474 |
| 6,937,744 B1 * | 8/2005 | Toyama | 382/103 |
| 2002/0130862 A1 * | 9/2002 | Lee et al. | 345/420 |
| 2003/0091228 A1 * | 5/2003 | Nagaoka et al. | 382/154 |
| 2003/0122831 A1 * | 7/2003 | Jeong et al. | 345/473 |
| 2003/0215130 A1 * | 11/2003 | Nakamura et al. | 382/154 |
| 2004/0017372 A1 * | 1/2004 | Park et al. | 345/475 |
| 2004/0179008 A1 * | 9/2004 | Gordon et al. | 345/419 |
| 2005/0083333 A1 * | 4/2005 | Gordon | 345/475 |

FOREIGN PATENT DOCUMENTS

| | | |
|---|---|---|
| KR | 2000-74633 | 12/2000 |
| KR | 2001-102881 | 11/2001 |
| KR | 2001-107478 | 12/2001 |
| KR | 2002-11851 | 2/2002 |
| KR | 2002-15234 | 2/2002 |
| KR | 2002--17576 | 3/2002 |
| KR | 2002-35386 | 5/2002 |

OTHER PUBLICATIONS

C. Bregler & J. Malik (1998). Tracking people with twists and exponential maps. Computer Vision and Pattern Recognition, p. 8-15.*

A. Azarbayejani & A. Pentland (1996). Real-time self-calibrating stereo person tracking using 3-D shape estimation from blob features. Proc. of the 13th International Conf. on Pattern Recognition, vol. 3, p. 6237-6632.*

John Russ (2002). The Image Processing Handbook, 4th edition. CRC Press.*

D. Coquin, P. Bolon, B. Ionescu (Aug. 2002). Dissimilarity measures in color spaces. Proceedings, 16$^{th}$ International Conference on Pattern Recognition, vol. 1, p. 612-615.*

A. Albiol, L. Torres, E. Delp (2001). Optimum color spaces for skin detection. Proceedings 2001 International Conference on Image Processing, vol. 1 p. 122-124.*

Foley et al. Computer Graphics: Principles and Practice. Addison-Wesley Publishing Company, Inc. 1996. p. 237-242.*

Brand et al. A Comparative Assessment of Three Approaches to Pixel-level Human Skin-Detection. Proceedings of the International Conference on Pattern Recognition. vol. 1. IEEE Computer Society. 2000. p. 1056-1059.*

Girondel et al. Hands Detection and Tracking for Interactive Multimedia Applications. ICCVG2002. Sep. 2002. p. 1-6.*

Koschan et al. Color Active Shape Models for Tracking Non-Rigid Objects. Pattern Recognition Letters. vol. 24. Issue 11. Jul. 2003. p. 1751-1765.*

* cited by examiner

APPARATUS AND METHOD FOR HIGH-SPEED MARKER-FREE MOTION CAPTURE

BACKGROUND OF THE INVENTION

1. Field of the Invention

The present invention relates to a motion capture apparatus and method used in various fields producing animations, movies, broadcasting contents, games, and the like, and more particularly, to an apparatus and method for a high-speed marker-free motion capture.

2. Discussion of the Related Art

As well known to those skilled in the art, motion capture techniques are widely used to make character's natural and vivid animation in various fields of producing 3-dimensional image contents such as animations, movies, broadcasting contents, games, etc.

According to kinds of sensors attached to an actor's joints, conventional motion capture techniques are divided into a magnetic type measuring positions using a variation amount of a magnetic field, a mechanical type directly measuring a bending of joints using a mechanical method, an optical type using images of passive (infrared rays) or active (LED, color) markers obtained by a camera, and an optical fiber type using a variation amount in transmission of light according to a bend degree of joints.

However, the conventional motion capture techniques have a disadvantage that sensors or makers must be attached to an actor's clothes or body and they must be operated under limited space and illumination conditions.

Meanwhile, in one method for detecting a human body's particular portion such as a head, hands and feet, corresponding pixels are made into a blob models and then adjacent pixels having a similar attribute in an image are compared with the blob models. In another method, based on a contour of a human body, the human body's particular portion is detected using type and strength of the contour. In case of making the blob models, the process of making the pixels having the similar attribute into the blobs is complicated. When there are many noises, it is difficult to make the blobs. Since the topology of the blobs is changed much according to a 3-dimensional movement, all the blob models with respect to various angles cannot be always made, so that it is difficult to achieve a stable and high-speed detection.

In practice, in the case of detecting a human body's end portion based on the contour, there may be a movement type that is not detected.

For example, if hands are raised over a head to cover the head, the contour that has formed in the head is not formed so that the head is not detected. Even when the contour is formed, it is difficult to stably detect the head because the corresponding contour is much different from a general contour of the head. In addition, if the hands are positioned at the front of the body, the contour corresponding to the hands disappears so that it is impossible to detect the hands. When detecting the food, if the foot is fixed to the ground, it can be stably detected without any change of attributes such as the type and strength of the contour. However, if the foot is raised, it is difficult to correctly detect the actual position of the foot due to the variation of the illumination condition, the magnitude variation of an image displayed on an imaging device, and the like.

In the above-described motion capture techniques, a method for tracking a human body's particular portion in the 3-dimensional space has a disadvantage that it cannot handle much information of the 3-dimensional space such as a depth information because images from the camera for obtaining the information on the 3-dimensional space is tracked in 2-dimensional plane. In addition, since the body's characteristic is distinguished using the contour model of an actor, it is difficult to extract the correct positions of the feature points such as the head, hands, foot, etc. Further, there is a disadvantage that a phenomenon of an overlapping or a disappearance of the feature points cannot be processed.

In particular, as a method for estimating a position of a middle joints of an actor using a feature point of the body's end portion such as the head, the hands and the feet, a paper of N. Badler, M. Hollick and J. Granieri, entitled "Real-time Control of a Virtual Human Using Minimal Sensors" (Presence, 2(1):82-86, 1993), discloses that after attaching four magnetic sensors to the hands, a waist and a head of an actor and capturing corresponding position information, a position of a middle joint of the upper part of the body is generated using the captured information. A paper of Ryuya Hoshino, Satoshi Yonemoto, Daisaku Arita and Rin-ichiro Taniguchi, entitled "Real-time Motion Capture System Based on Silhouette Contour Analysis and Inverse Kinematics" (FCV2001, 2001, p157-163), discloses that positions of the feature points of the body are extracted using a silhouette information extracted from an actor's motion image captured by six cameras, and similar movements are selected in previously-provided database using coordinates of a middle joint and positions of captured feature points, obtained by calculating 3-dimensional coordinates of the middle joint using the extracted positions. However, the method disclosed in the former paper is limited to only the movement of the upper part of the body. Noises are contained in the captured position information due to the sensors that are sensitive to an environment change. In addition, there is a disadvantage that an operation is limited due to the attachment of the magnetic sensor. The method disclosed in the latter paper has problems that an additional database for many situations must be established and which movement to be selected in the database must be taken into consideration.

SUMMARY OF THE INVENTION

Accordingly the present invention has been devised to solve the foregoing problems of the prior art, and it is an object of the invention to provide an apparatus and method for a high-speed marker-free motion capture, which is capable of powerfully detecting a body's feature points corresponding to a body's end portions (end-effector) such as a head, hands, feet, trunk, arms and legs at a high speed in an illumination change or background or noises of cameras. In addition, the extracted feature points of the body can be directly tracked stably in a 3-dimensional space. The position errors of the feature points due to the change of the illumination conditions or a shadow can be automatically corrected and the feature points can be stably tracked with respect to overlapping and disappearing of the feature points. Further, when coordinates of the middle joints are estimated using 3-dimensional coordinates of the extracted feature points of the body, the apparatus and method of the present invention restores a human model by estimating the positions of the middle joints of the actor with high reality without using motion database.

To achieve the above object, there is provided an apparatus for a high-speed marker-free motion capture, which comprises: a 2-dimensional feature point extraction module for obtaining an image with respect to a background with no actor by using a plurality of cameras having different viewing angles from each other to store the obtained image as RGB color space having a characteristic which easily emphasizes color difference and HSI color space having a characteristic which easily emphasizes color similarity, obtaining an image with respect to an initial posture of the actor to make a blob model with respect to a head, hands, feet, trunk, arms and legs, extracting an adjacent connection relationship between them and storing the extracted relationship, receiving the photographed image of the movement of the actor to extract pixels having the color different from the background, detecting pixels having color and shape similar to the stored blob model with respect to the respective parts of the body to make the detected pixels into the blobs, distinguishing the blobs corresponding to the parts of the body from the correlation of the adjacent blobs with respect to the detected blobs, and determining the distinguished blobs as 2-dimensional body feature points; a 3-dimensional feature point tracking module for performing 3-dimensional matching with respect to the 2-dimensional feature points corresponding to the body's end portions extracted by the 2-dimensional feature point extraction module, restoring 3-dimensional coordinates, and performing a tracking operation by predicting shape changes of the feature points and the body's center of gravity; and a 3-dimensional motion restoration module for predicting a position of a middle joint using the 3-dimensional coordinates of the 2-dimensional feature points tracked by the 3-dimensional feature point tracking module, generating 3-dimensional motion data, and restoring the 3-dimensional motion data to a human model.

To achieve the above objects, there is provided a method for a high-speed marker-free motion capture, which comprises the steps of: obtaining an image with respect to a background with no actor and storing the obtained image as two color spaces whose characteristics are different from each other using a plurality of cameras having different viewing angles from each other by a 2-dimensional feature point extraction module; obtaining an image with respect to an initial posture of the actor using the cameras to make blob 0models with respect to a head, hands, feet, trunk, arms and legs, extracting an adjacent connection relationship between them, and storing the extracted relationship by the 2-dimensional feature point extraction module; receiving the photographed image of the movement of the actor to extract pixels having the color different from the background, detecting pixels having color and topology similar to the stored blob models with respect to the respective parts of the body, and making the detected pixels into the blob by the 2-dimensional feature point extraction module; distinguishing the blobs corresponding to the parts of the body from the correlation of the adjacent blobs with respect to the detected blobs and determining the distinguished blobs as the 2-dimensional body feature points by the 2-dimensional feature point extraction module; performing 3-dimensional matching with respect to the 2-dimensional feature points corresponding to the body's end portions extracted by the 2-dimensional feature point extraction module to restore 3-dimensional coordinates, and performing a tracking operation by predicting topology changes of the feature points and the body's center of gravity by a 3-dimensional feature point tracking module; and estimating the position of a middle joint using the 3-dimensional coordinates of the 2-dimensional feature points tracked by the 3-dimensional feature point tracking module to generate 3-dimensional motion data, and restoring the 3-dimensional motion data to a human model by a 3-dimensional motion restoration module.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
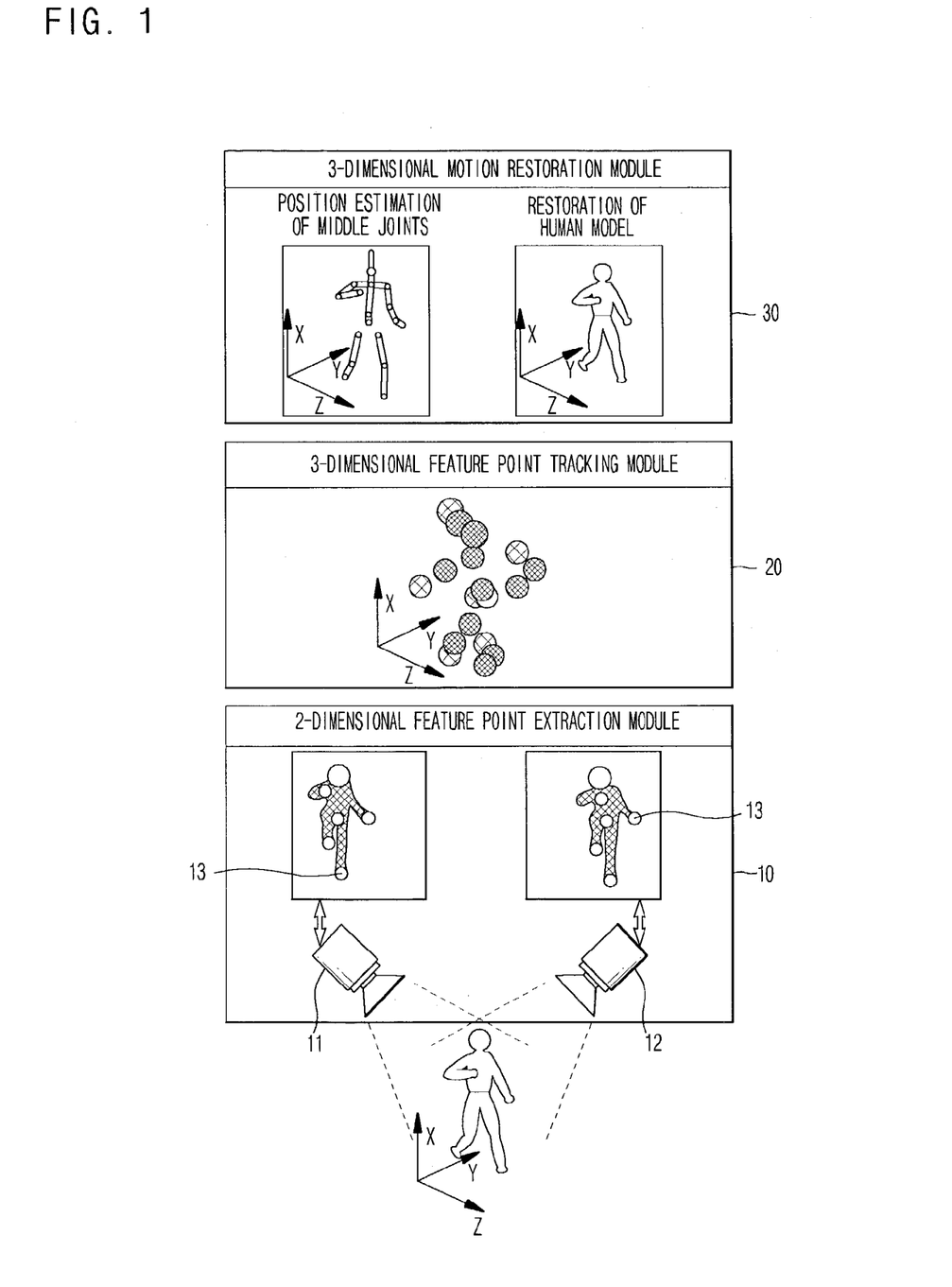
FIG. 1 is a view of an apparatus for a high-speed marker-free motion capture in accordance with the present invention.

Referring to FIG. 1, using a plurality of cameras 11 and 12 having different viewing angles from each other, a 2-dimensional feature point extraction module 10 obtains an image with respect to a background in which there is no actor and then stores the obtained image as RGB color space having a characteristic which can easily emphasize color difference and HSI color space having a characteristic which can easily emphasize color similarity. Then, the 2-dimensional feature point extraction module 10 obtains an image with respect to an initial posture of the actor and makes blob models with respect to a head, hands, feet, trunk, arms and legs. The 2-dimensional feature point extraction module 10 extracts an adjacent connection relationship between them and stores the extracted relationship.

The 2-dimensional feature point extraction module 10 constructs the blob models with respect to the head, the hands, the feet, the trunk using color component information in the HSI color space, a magnitude and a topology information with respect to the respective parts of the body.

The 2-dimensional feature point extraction module 10 receives the photographed image of the movement of the actor and extracts pixels having the color different from the background. The 2-dimensional feature point extraction module 10 detects pixels having color and topology similar to the stored blob models with respect to the respective parts of the body and then makes the detected pixels into the blobs. The blobs corresponding to the parts of the body is distinguished from the correlation of the adjacent blobs with respect to the detected blobs and determined as 2-dimensional body feature points 13.

When the 2-dimensional feature point extraction module 10 receives the photographed image of the movement of the actor and extracts the pixels having the color different from the background, candidate pixels having the color different from the background are extracted through a comparison of the color components in the RGB color space having a characteristic which can easily emphasize the color difference.

The 2-dimensional feature point extraction module 10 detects the pixels having color and topology similar to the stored blob models with respect to the respective parts of the body using the HSI color space having a characteristic which can easily emphasize the color similarity and then makes the detected pixels into the blobs.

The 2-dimensional feature point extraction module 10 first carries out a comparison sequence with respect to the RGB color space which can easily emphasize the color difference and then selects candidate pixels. Thereafter, the 2-dimensional feature point extraction module 10 transforms the candidate pixels into the HSI color space which can easily emphasize the color similarity and finds pixels having color similar to the models of the respective parts of the body. After the process having a small amount of operation is first carried out to detect the candidate pixels, the process having a large amount of operation is applied only to the limited candidate pixels, so that the process of finding the color pixels can be performed at a high speed.

The 2-dimensional feature point extraction module 10 selects the pixels having color difference and separates the actor from the background. Then, the 2-dimensional feature point extraction module 10 retrieves the pixels similar to the models of the respective parts of the body, so that a shadow can be efficiently removed.

Based on the correlation that the hands and arms are always adjacent to each other, the feet and legs are always adjacent to each other and the head can be attached to the arms or legs and the hands or the feet while the head are always attached to the trunk, the 2-dimensional feature point extraction module 10 distinguishes the blobs corresponding to the parts of the body and determines it as the 2-dimensional body feature points 13.

A 3-dimensional feature point tracking module 20 performs 3-dimensionla matching with respect to the 2-dimensional feature points 13 corresponding to the body's end portions extracted by the 2-dimensional feature point extraction module 10 and restores 3-dimensional coordinates. Then, the 3-dimensional feature point tracking module 20 performs a tracking operation by predicting topology changes of the feature points and the body's center of gravity.

Using a topology change prediction filter 21, the 3-dimensional feature point tracking module 20 restores the 3-dimensional coordinates by predicting a length, a width and a variation of rotation angles of a minimum circumscribed quadrangle, which surrounds 3-dimensional matched feature point area, as topology information to be inputted in a next frame by using information on sequence frames.

The 3-dimensional feature point tracking module 20 predicts and calculates the change of the center of the gravity in the movement from the first frame to the previous frame. Using a method of predicting the center of the gravity, which limits the movement of the foot to which the center of the gravity is applied, the 3-dimensional feature point tracking module 20 predicts the topology change of the feature points and the body's center of the gravity by correctly tracking the feet.

A 3-dimensional motion restoration module 30 predicts a position of a middle joint using the 3-dimensional coordinates of the 2-dimensional feature points tracked by the 3-dimensional feature point tracking module, generates 3-dimensional motion data, and then restores the 3-dimensional motion data to a human model.

The 3-dimensional motion restoration module 30 sets boundary values with respect to the actor's body as a method for calculating the most proper unique solution among a plurality of solutions to the joints generated by an inverse kinematics. The positions of the middle joint of the actor are estimated by applying a limitation condition that there is no collision with the actor's own body based on the boundary values and it is possible to pass through the body.

Hereinafter, an operation of the apparatus for the high-speed marker-free motion capture in accordance with the present invention will be described in detail.

Figure 2:
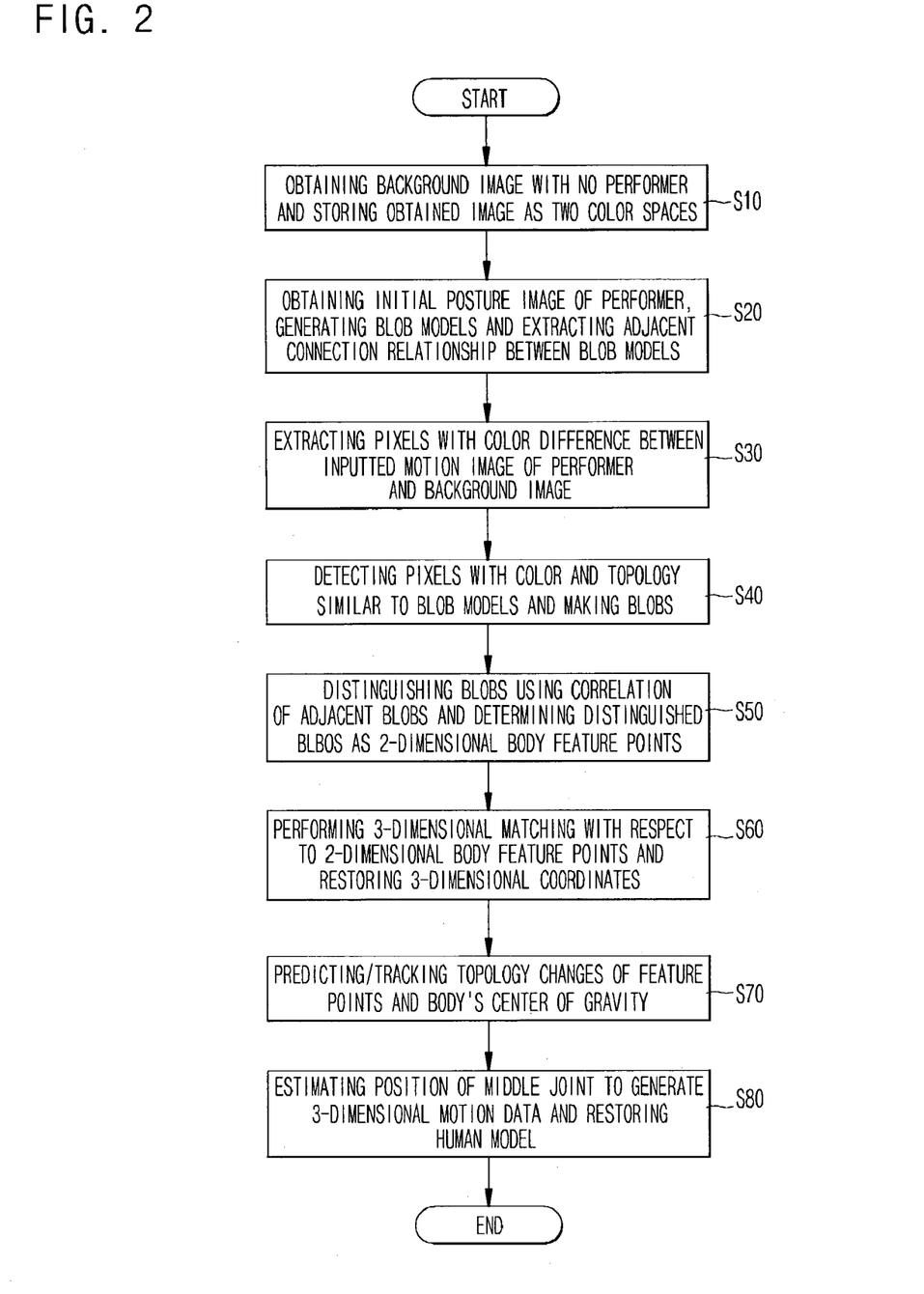
FIG. 2 is a flowchart showing a method for a high-speed marker-free motion capture in accordance with the present invention.

Referring to FIG. 2, at an initial stage, using at least two cameras 11 and 12 having different viewing angles from each other, the 2-dimensional feature point extraction module 10 obtains an image with respect to a background in which there is no actor and then stores the obtained image as two color spaces whose characteristics are different from each other (S10).

At this time, the two color spaces are defined as the RGB color space having a characteristic which can easily emphasize color difference and the HSI color space having a characteristic which can easily emphasize color similarity.

Then, the 2-dimensional feature point extraction module 10 obtains an image with respect to an initial posture of the actor using the cameras 11 and 12 and makes blob models with respect to a head, hands, feet, trunk, arms and legs. The 2-dimensional feature point extraction module 10 then extracts an adjacent connection relationship between them and stores the extracted relationship (S20).

At this time, the 2-dimensional feature point extraction module 10 separates the head, the hands, the feet, the trunk, the arms and the legs based on the color in the initial posture of the actor and makes the blob models using the respective HIS colors and the respective topology information. Then, the adjacent connection relationship of the blob models with respect to the respective parts of the body is extracted and stored.

Then, the 2-dimensional feature point extraction module 10 receives the photographed image of the movement of the actor and extracts pixels having the color different from the background (S30). The 2-dimensional feature point extraction module 10 detects pixels having color and topology similar to the stored blob models with respect to the respective parts of the body and then makes the detected pixels into the blobs (S40). The blobs corresponding to the parts of the body are distinguished from the correlation of the adjacent blobs with respect to the detected blobs and determined as the 2-dimensional body feature points 13 (S50).

At this time, the 2-dimensional feature point extraction module 10 captures the actor using the cameras 11 and 12 to detect specific parts of the body. First, by comparing the background of the RGB color with the RGB value of the inputted image, a portion having a difference in the color component value, i.e., the candidate pixel, is detected and a color transformation into the HSI color space is carried out. Then, through a comparison with the background's HSI color value with respect to the stored pixels, similar pixels are removed. If doing so, a shadow formed due to an illumination change or the actor's movement can be removed and only the image of a hip corresponding to the body's part can be detected from the background.

In practice, the RGB color space is a space in which the color difference can be easily emphasized, and the HSI color space is a space in which the color similarity can be easily emphasized. Therefore, the process of transforming the candidate pixels from the RGB color space to the HSI color space in order for the 2-dimensional feature point extraction module 10 to detect the specific parts of the body from the captured image of the actor is a process requiring a long time. Accordingly, the 2-dimensional feature point extraction module 10 first retrieves portions different from the background in the RGB color space, and classifies the portion different from the background, i.e., pixels having a strong possibility of being the parts of the body. After transforming only these pixels from the RGB color space to the HSI color space, colors similar to the background are removed. Since only colors similar to the models are classified, the blobs corresponding to the respective parts of the body can be detected at a high speed without any influence of the shadow.

The actor's shadow formed on the ground is naturally removed with ease through the above-described procedures, so that the feet can be correctly detected. In addition, there is no influence of the background or the noises caused by the cameras through the correlation with the position of the extracted blobs. Further, the parts of the body can be classified and detected with a high reliability.

In other words, since the adjacent information between the respective blob models is also stored when the blob models are made according to the parts of the body, it is possible to remove the similar blobs which is made by color modulation due to the background or the noises caused by the cameras 11 and 12 by applying the correlation that the hands and arms are always adjacent to each other, the feet and legs are always adjacent to each other and the head can be attached to the arms or legs and the hands or the feet while the head are always attached to the trunk. Therefore, the apparatus of the present invention is resistant to the noises and operates more stably than the case when only the existing simple blob models are applied. In addition, the specific parts of the body can be detected in more various movements than the case when the method based on the contour is applied.

After the 2-dimensional feature point extraction module 10 distinguishes the blobs corresponding to the parts of the body based on the correlation of the adjacent blobs with respect to the detected blobs and determines them as the 2-dimensional body feature points 13, the 3-dimensional feature point tracking module 20 performs 3-dimensional matching with respect to the 2-dimensional feature points 13 corresponding to the body's end portions extracted by the 2-dimensional feature point extraction module 10 and restores 3-dimensional coordinates (S60). Then, the 3-dimensional feature point tracking module 20 performs a tracking operation by predicting topology changes of the feature points and the body's center of gravity (S70).

At this time, in order to track the feature points of the 3-dimensional space, the 3-dimensional feature point tracking module 20 transforms the 2-dimensional feature points 13 into the points of the 3-dimensional space using internal/external factors of the cameras 11 and 12 obtained through the camera calibration, thus causing the correct to-be-tracked feature points 13 and many feature points (ghosts) having incorrect information.

Then, the 3-dimensional feature point tracking module 20 performs a tracking operation to obtain the correct feature points 13 among a large number of candidates of the feature points 13 though a probability calculation with respect to time conditions between frames and space conditions that the feature points can be positioned.

An algorithm that can simultaneously predict the movements of the feature points 13 with respect to the continuous time flow is applied to the time conditions. The prediction of the movements can be performed through a probability approach. If knowing the movement patterns up to the previous frame, a movement information on a next frame can be predicted. In general, in case of pairing the feature points 13, the feature point 13 that is closest to a predicted position among the input feature points 13 are selected. However, since the characteristic of the body moves freely in the 3-dimensional space, it is also necessary to process an unexpected appearance of an area similar to the characteristic of the body in the background as well as an overlapping or disappearing of the feature points 13. Therefore, these processes can be solved by adding the space conditions to the time conditions.

The space conditions are conditions of checking the space position information of the feature points 13 obtained in the current frame. The topology of the characteristic is easily changed according to the movements. Therefore, in order to calculate the correct positions and magnitudes of the characteristic, the 3-dimensional feature point tracking module 20 corrects the position information error according to the illumination condition or the topology change by applying the automated error correction method using the topology change prediction filter 21. Then, conditions that the respective feature points 13 can be moved are constructed based on the structure of the body. Just as the arms cannot be bent backwardly, the joints of the body have the limitation on the rotation or movements. The feature points 13 must exist within the maximum distance in which the characteristic of the body can be positioned from the center of the body. In addition, since there is a difference between the degree of the movement in one portion to which the center of gravity is applied and that of the other portions, it is possible to correctly match the feature points 13 through a method of predicting the body's center of gravity by considering these conditions.

Figure 3:
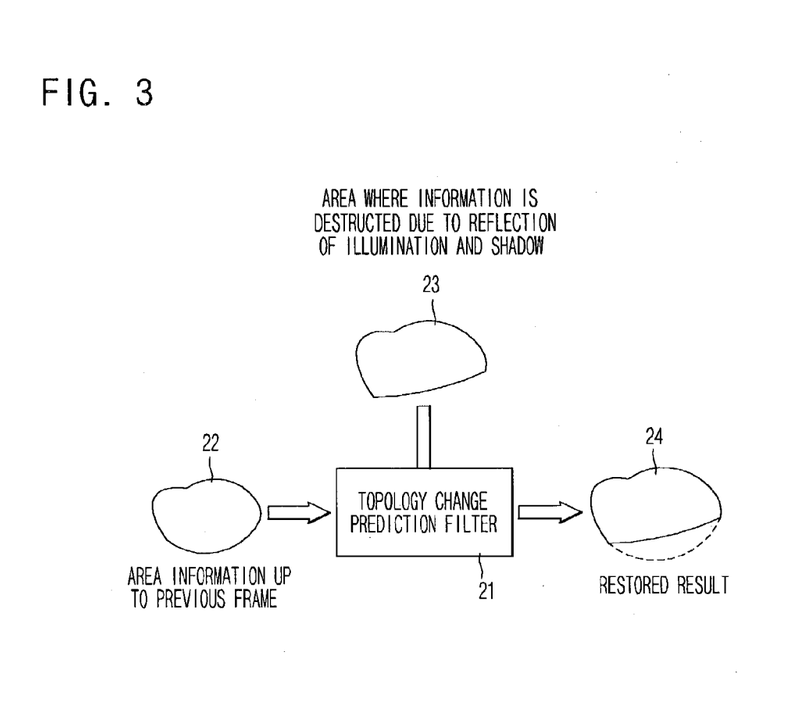
FIG. 3 is a view showing an operation state of a topology change prediction filter performing an automated error correction method.

Referring to FIG. 3, the automated error correction method using the topology change prediction filter 21 of the 3-dimensional feature point tracking module 20 is a technique for correcting the feature point area 23 in which information is not correctly read and extracted due to a reflection or shadow, caused by the illumination, and noises when extracting the feature points in the images. This is a technique for restoring the 3-dimensional coordinates by predicting the length, the width and the variation of the rotation angles of the minimum circumscribed quadrangle, which surrounds the feature point area, as the topology information to be inputted in a next frame by using the information 22 on the sequence frames.

For example, since the feature points such as the hands are very freely changed, there may occur a large error between the predicted information of the minimum circumscribed quadrangle to be inputted at a next time and the information to be actually inputted. However, even if the topology information on the hands has any types, since the topology information thereon can be modeled as an approximated elliptical type, the variation of the topology can be predicted within a small error range using additionally the modeling information.

Figure 4:
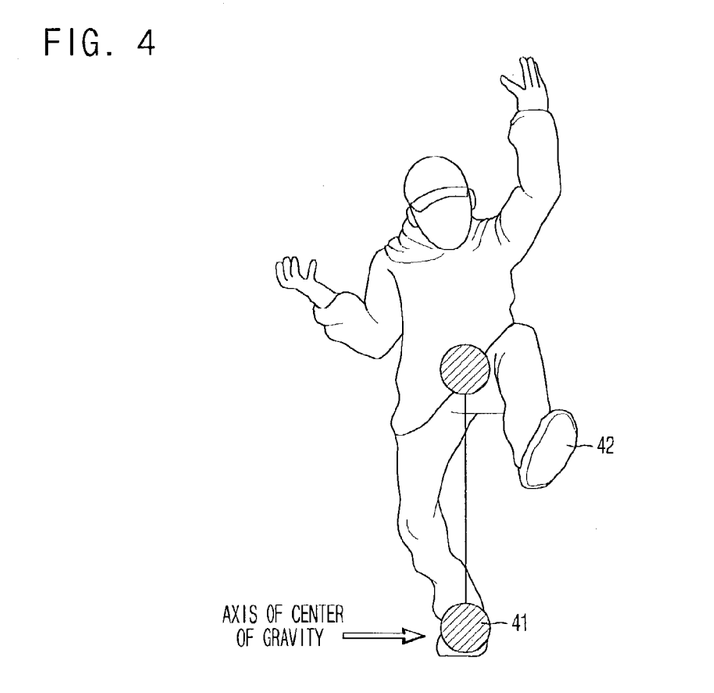
FIG. 4 is a view of a moving human model used to apply a method for predicting body's center of gravity.

In addition, the method of predicting the body's center of gravity is based on the fact that the axis of the center of gravity is moved to one foot when the human standing on two feet moves. Since the foot moves adjacently to the other foot within a small range, the phenomenon of the overlapping and the disappearance frequently occurs. Further, since the case that the overlapped or disappeared foot is separated or again appears after a long time elapses also occurs frequently, there is a limitation on the tracking when using only the tracking method considering the movement direction and speed of the foot. Accordingly, as shown in FIG. 4, the present invention makes the tracking of the feet powerful by predicting and calculating the shift 42 of the center of gravity in the movements up to the previous frame and limiting the movement of the foot 41 to which the center of gravity is applied.

Then, the 3-dimensional feature point tracking module 20 performs the 3-dimensional matching with respect to the 2-dimensional feature points 13 and restores the 3-dimensional coordinates. The 3-dimensional feature point tracking module 20 performs a tracking operation by predicting the topology changes of the feature points and the body's center of gravity. Finally, the 3-dimensional motion restoration module 30 predicts the position of a middle joint using the 3-dimensional coordinates of the 2-dimensional feature points tracked by the 3-dimensional feature point tracking module 20, generates the 3-dimensional motion data, and then restores the 3-dimensional motion data to the human model (S80).

Figure 5:
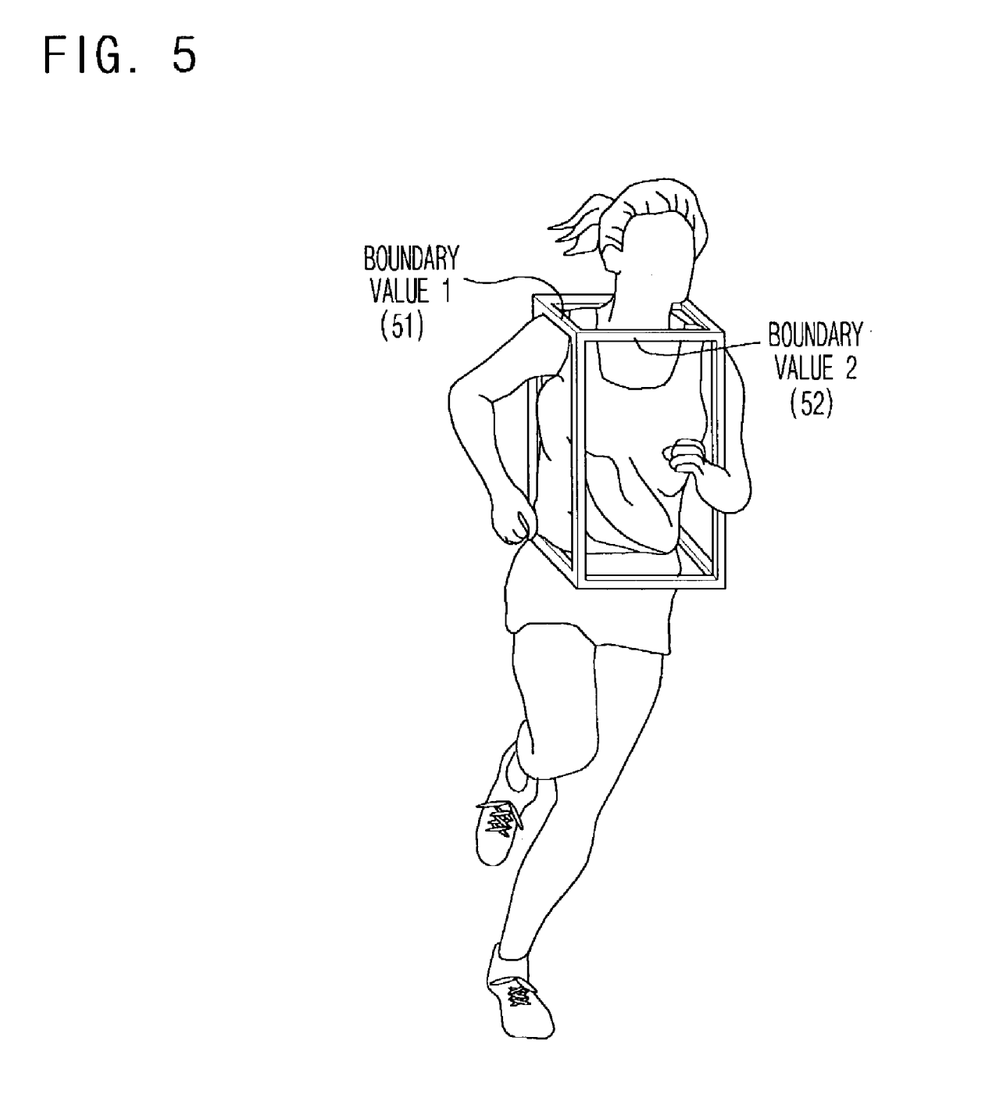
FIG. 5 is an exemplary view showing boundary values in the human body.

At this time, in order to estimate the coordinates of the middle joints using the feature points 13, the 3-dimensional motion restoration module 30 applies the 3-dimensional position information of the feature points 13 to the inverse kinematics method. However, if applying the inverse kinematics method, there are many solutions in which the middle joints can be positioned, so that there is needed a method of selecting the most suitable one of the many solutions. Therefore, as shown in FIG. 5, by using first and second boundary values 51 and 52 according to the body topology information, such as a thickness, a width and a length of the respective parts of the actor, generated when forming the model of an initial actor, the present invention limits and generates several solutions in which the middle joints can be positioned by applying the conditions that the actor's own body is not passed and penetrated. Then, one middle joint position is selected among the generated solutions using the joint position change of the previous frames among the generated solutions.

If the position information on all the joints of the body is restored from the images inputted through all the above-described processes, the 3-dimensional motion restoration module 30 generates the 3-dimensional motion data and restores the 3-dimensional motion data to the human model.

As described above, the apparatus and method for the high-speed marker-free motion capture in accordance with the present invention has an advantage that there is no influence of the shadow causing the color change in the parts of the body that is inevitably formed according to the movements of the actor and thus becomes the extraction target. Further, there is an advantage that the parts of the body can be stably detected without being greatly influenced by the illumination change caused due to the movements. Furthermore, the calculated amount of the influence of the shadow can be removed at a high speed using the two color spaces (RGB and HSI).

Using the automated error correction method through the shape change prediction, the apparatus and method for the high-speed marker-free motion capture in accordance with the present invention predicts the changes of the feature points with respect to the noise and the reflection or shadow, which is caused by the illumination change, and corrects the shape information of the feature points, thereby reducing the position error of the feature points in the 3-dimensional space.

By predicting the body's center of the actor, the apparatus and method for the high-speed marker-free motion capture limits the movement of the foot that is an axis of the movement of the actor, so that the foot which is difficult to track in the 3-dimensional space can be more correctly and stably tracked.

Simultaneously using the body's topology information and the changes of the middle joint positions up to the previous frame when estimating the coordinates of the middle joints, the apparatus and method for the high-speed marker-free motion capture in accordance with the present invention can estimate the positions of the middle joints of the actor with high reality without using a motion database.

The apparatus and method for the high-speed marker-free motion capture in accordance with the present invention suppresses and stably process the influence of the noises according to the respective steps, thereby securing the stability and reality of the 3-dimensional motion data required in the motion capture.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. An apparatus for a high-speed marker-free motion capture comprising:
   a 2-dimensional feature point extraction module for obtaining an image with respect to a background with no actor by using a plurality of cameras having different viewing angles from each other to store the obtained image as RGB color space and HSI color space, obtaining an image with respect to an initial posture of the actor to make blob models with respect to a head, hands, feet, trunk, arms and legs, extracting an adjacent connection relationship between the blob models and storing the extracted relationship, receiving the photographed image of the movement of the actor to extract pixels having the color different from the background, detecting pixels having color and shape similar to the stored blob models with respect to the respective parts of the body to make the detected pixels into the blobs, distinguishing the blobs corresponding to the parts of the body from the correlation of the adjacent blobs with respect to the detected blob, and determining the distinguished blobs as 2-dimensional body feature points;
   a 3-dimensional feature point tracking module for performing 3-dimensional matching with respect to the 2-dimensional feature points corresponding to the body's end portions extracted by the 2-dimensional feature point extraction module, restoring 3-dimensional coordinates, and performing a tracking operation by predicting shape changes of the feature points and the body's center of gravity; and
   a 3-dimensional motion restoration module for predicting a position of a middle joint using the 3-dimensional coordinates of the 2-dimensional feature points tracked by the 3-dimensional feature point tracking module, generating 3-dimensional motion data, and restoring the 3-dimensional motion data to a human model;
   wherein if the 2-dimensional feature point extraction module receives the photographed image of the movement of the actor and extracts the pixels having the color different from the background, the 2-dimensional feature point extraction module extracts candidate pixels having the color different from the background through a comparison of the color components in the RGB color space; and wherein the 2-dimensional feature point extraction module first carries out a comparison sequence with respect to the RGB color space to select candidate pixels, and transforms the candidate pixels into the HSI color space to find pixels having color similar to the models of the respective parts of the body.

2. The apparatus of claim 1, wherein the 2-dimensional feature point extraction module constructs the blob models with respect to the head, the hands, the feet, the trunk using color component information in the HSI color space, and a magnitude and a shape information with respect to the respective parts of the body.

3. The apparatus of claim 1, wherein the 2-dimensional feature point extraction module detects the pixels having color and shape similar to the stored blob models with respect to the respective parts of the body using the HSI color space, and makes the detected pixels into the blobs.

4. The apparatus of claim 1, wherein the 2-dimensional feature point extraction module selects the pixels having the color difference to separate the actor from the background, and retrieves the pixels similar to the models of the respective parts of the body.

5. The apparatus of claim 1, wherein the 2-dimensional feature point extraction module distinguishes the blobs corresponding to the parts of the body and determines the distinguished blobs as 2-dimensional body feature points.

6. The apparatus of claim 1, wherein the 3-dimensional feature point tracking module predicts and calculates the movement of the center of the gravity in the movement up to the previous frame, and predicts the shape change of the feature points and the body's center of the gravity by correctly tracking the feet using a prediction of the center of the gravity, which limits the movement of the foot to which the center of the gravity is applied.

7. The apparatus of claim 1, wherein the 3-dimensional motion restoration module sets boundary values with respect to the actor's body, and estimates positions of the middle joint of the actor by requiring that there is no collision with the actor's own body based on the boundary values.

* * * * *

UNITED STATES PATENT AND TRADEMARK OFFICE
CERTIFICATE OF CORRECTION

PATENT NO. : 7,239,718 B2 Page 1 of 1
APPLICATION NO. : 10/445825
DATED : July 3, 2007
INVENTOR(S) : Chang Jun Park et al.

It is certified that error appears in the above-identified patent and that said Letters Patent is hereby corrected as shown below:

On The Title Page, Item 75, Inventors should read
(75) Inventors: Chang Joon PARK, Taejon (KR); Ji Hyung LEE, Taejon (KR); Do-Hyung KIM, Taejon (KR); Seung Woo NAM, Taejon (KR); Seong Min BAEK, Taejon (KR); In Ho LEE, Taejon (KR); Sung-Eun KIM, Taejon (KR)

Signed and Sealed this

Twenty-seventh Day of November, 2007

JON W. DUDAS
*Director of the United States Patent and Trademark Office*